US006666225B2

(12) United States Patent
Kemmner et al.

(10) Patent No.: US 6,666,225 B2
(45) Date of Patent: Dec. 23, 2003

(54) SYSTEM AND METHOD FOR OPTIMIZING THE EFFICIENCY OF AN OIL SUPPLY

(75) Inventors: Benjamin Kemmner, Unterensingen (DE); Albrecht Schäfer, Uhingen (DE)

(73) Assignee: DaimlerChrysler AG, Stuttgart (DE)

( * ) Notice: Subject to any disclaimer, the term of this patent is extended or adjusted under 35 U.S.C. 154(b) by 270 days.

(21) Appl. No.: 09/934,668

(22) Filed: Aug. 23, 2001

(65) Prior Publication Data

US 2002/0040603 A1 Apr. 11, 2002

(30) Foreign Application Priority Data

Aug. 23, 2000 (DE) .......................................... 100 41 386

(51) Int. Cl.$^7$ ............................................ F15B 13/042
(52) U.S. Cl. ................ 137/14; 137/565.26; 137/625.69
(58) Field of Search ........................ 137/565.26, 625.69, 137/625.25, 625.65

(56) References Cited

U.S. PATENT DOCUMENTS

| | | | | | |
|---|---|---|---|---|---|
| 3,534,774 | A | * | 10/1970 | Tennis | 137/596 |
| 5,445,188 | A | * | 8/1995 | Bourkel et al. | 137/625.64 |
| 6,234,201 | B1 | * | 5/2001 | Strobel | 137/596 |
| 6,561,221 | B1 | * | 5/2003 | Kurz | 137/596.17 |

* cited by examiner

*Primary Examiner*—Kevin Lee
(74) *Attorney, Agent, or Firm*—Crowell & Moring LLP

(57) ABSTRACT

A system and method serve for optimizing the efficiency of an oil supply having at least two different oil pressure levels. The system has at least two feed devices and at least one control slide with at least two narrowed sections. Each of the narrowed sections is assigned one of the feed devices. Depending on the position of the narrowed sections in the control slide, the respective volume flows are automatically divided into the at least two pressure levels for each of the feed devices as a function of the oil requirement in the respective pressure level.

36 Claims, 2 Drawing Sheets

SYSTEM AND METHOD FOR OPTIMIZING THE EFFICIENCY OF AN OIL SUPPLY

BACKGROUND AND SUMMARY OF THE INVENTION

This application claims the priority of German Application No. DE 100 41 386.2, filed in Germany on Aug. 23, 2000, the disclosure of which is expressly incorporated by reference herein.

The invention relates to a system and method for optimizing the efficiency of an oil supply comprising at least two different oil pressure levels, at least two feed devices for oil volume flow of the oil supply and at least one control slide for controlling at least one of the oil pressure levels.

In known systems for supplying oil to hydraulic systems, in particular, in such systems for automatic transmissions, a large part of the power losses are caused by the supplying of hydraulic actuators. These hydraulic actuators include, for example, clutches and variators in continuously variable transmissions (CVT). The oil supply which permits pressure to be built up at the actuators is implemented by means of one or more feed devices or oil pumps. The necessary pressure level of such pumps is between 15 and 30 bar in the case of step-by-step variable transmissions. In step-by-step variable transmissions, it is necessary to allow for up to 80 bar and higher. Owing to their high drive power, the oil pumps in automatic transmissions are therefore almost always driven by the internal combustion engine by means of a fixed transmission ratio.

The hydraulic pump power $P_{hyd}$ is generally as follows:

$$P_{hyd} = \Delta P_{pump} \cdot Q_{pump} \cdot 1/\eta_{pump}$$

Here, $\Delta p$ is the pressure difference, Q is the volume flow and $\eta$ is the efficiency of the respective pump.

Because the pumps used in automatic transmissions are predominantly what are referred to as constant delivery pumps with a constant delivery volume per revolution, that is to say gearwheel or vane pumps, the delivered pump volume flow is dependent on the rotational speed of the internal combustion engine owing to the fixed transmission ratio of the drive by the internal combustion engine.

However, this disadvantage is accepted because such constant delivery pumps have advantages for high pressure levels owing to their robustness and their low cost as well as their low noise level and the possibility of implementing them in a simple technical way. In addition, these constant delivery pumps have efficiency advantages over pumps with a variable delivery volume per revolution.

In order to keep the power losses in the transmission as low as possible, the delivery volume of the oil pumps must be of such a magnitude that the oil supply is just still sufficient in all the necessary operating states of the transmission.

A problem is then that the dimensioning of the pumps must be defined with reference to operating states at a low engine speed, that is to say with a low rotational speed of the pump and resulting low delivery quantities. When the rotational speeds of the engine and of the pump are correspondingly higher, there is thus a very large excess delivery quantity, as a result of which there is an unnecessary power loss. In addition, this hydraulic power loss rises in accordance with the formula stated above as the pressure level becomes larger because the pump then has to generate a higher pressure difference $\Delta p$ between the reservoir pressure level and the necessary pressure level.

In order to counteract this problem, it is known from the general state of the art to use an electrically switchable double chamber pump. This oil pump is divided into two chambers with different delivery volumes per revolution. One of the two chambers can be switched to a pressureless state by way of an electrical switching operation which is passed on to the pump by way of an electrohydraulic valve.

During operation, this means that both chambers feed at the same pressure level at low rotational speeds of the pump or when the actuators' oil quantity requirement is relatively large. The double chamber pump then operates as a large constant delivery pump. As soon as relatively high rotational speeds of the pump are reached and the actuators only demand a small volume flow of oil from the oil supply, the switchable chamber is switched to a pressureless state. The double chamber pump then operates principally only as a small constant delivery pump with the delivery volume of just one of the chambers. In this case, the power loss of the double chamber pump is reduced.

However, this principle also has specific disadvantages. The step-by-step switching only partially resolves the abovementioned problem of the oil supply because within a step there continue to be large ranges in which excess oil quantities are fed.

Further disadvantages arise as a result of the electrohydraulic valve which is additionally required for switching over the pump. Said valve requires corresponding installation space and leads to additional costs. The additional valve also gives rise to further oil leakages which make it necessary to have a larger overall delivery volume of the double chamber pump and thus increase the power loss once more.

An additional disadvantage is the electrical switchability of the double chamber pump, which requires a switching strategy provided specifically for that purpose. This switching strategy is dependent on a large number of factors. These factors, which include, for example, dependences on the rotational speed of the pump, on the oil requirement of the actuators, on the change in leakage rates with temperature, on the change in leakage rates with the service life etc., make it necessary to develop a comparatively costly strategy. In addition, owing to the fluctuations and differences in the abovementioned factors this strategy cannot be an absolute strategy, but rather it must always provide reliability in terms of the delivery quantity before the operation of switching to just one of the chambers. This also disadvantageously gives rise to a further power loss.

Because the electrical switchability of the double chamber pump does not function in the case of a power failure, that is to say in emergency mode, a correspondingly high delivery quantity is always fed in this case, which in turn has disadvantageous effects on the dimensioning of the necessary cooling system so that this cooling system has to be overdimensioned for the normal operation which occurs before the predominantly greater part of the time.

In addition, in automatic transmission there is also the factor that the oil actuators, that is to say the actuators which have to be supplied by the oil pump or pumps, operate at different pressure levels. However, because the oil pump can only feed at one pressure level, the entire delivery volume flow must always be fed at the maximum required pressure of the transmission. The oil for the actuators at a lower pressure level is usually only subsequently throttled from the high pressure level to the necessary lower pressure level, resulting in further very large power losses.

An object of the invention, then, is to provide a system for supplying oil with optimized efficiency, in particular for an automatic transmission which is capable of making available at least two different oil pressure levels, and these at least two oil pressure levels are to be controlled automatically as a function of the system requirements and independently of any external auxiliary power.

This object is achieved according to certain preferred embodiments of the invention by that the at least one control slide has at least two narrowed sections, each of the narrowed sections being assigned one of the feed devices and, depending on a position of the narrowed sections in the control slide, the respective volume flows being automatically divided into the at least two pressure levels for each of the feed devices as a function of an oil requirement in the respective pressure level.

The oil supply is provided by the at least two feed devices which, according to the principle, are independent of one another in size and design. However, it would be appropriate here, in a particularly favorable embodiment of the invention, to use a double chamber pump which is uniform in its design because this constitutes a very robust, simple, space-saving and cost-effective solution.

Because the volume flow of each of the feed devices is divided to the respective pressure levels by way of a separate narrowed section of at least one control slide, it is possible that under suitable operating conditions just one of the feed devices feeds at the high pressure level while the pressure level into which the other feed device feeds has already been reduced.

The setting of the desired pressure takes place in the manner known from conventional control slides, with a narrowed section. Here, a specified pressure, which can, for example, also vary as a function of time, is applied to one effective area of the control slide. Meanwhile another, second effective area, which has a certain ratio with respect to the first effective area, has a pressure applied to it which can be set by the control slide. However, a pressure which is increased in comparison with the first specified pressure in accordance with the ratio, which is referred to as the pressure transmission ratio, of the two effective areas with respect to one another, will then be set at the outputs of the control slide. This is a hydraulic, self-regulating system which does not require any external auxiliary power.

One of the advantages of certain preferred embodiments of the system lies in the fact that, when the oil quantity requirement of the actuators supplied drops and/or the rotational speed of the feed devices increases, the pressure level of one of the pumps is reduced incrementally and the power loss associated with this pump can thus be reduced.

In addition, a further advantage is obtained by virtue of the fact that further power loss can be prevented because the two feed devices make available the necessary overall system volume, and the two pumps do not need to always feed with the maximum required pressure. The oil for the actuators which operate at the lower pressure level can, according to certain preferred embodiments of the invention, be fed only by one of the pumps in certain operating states, which pump then feeds exclusively into this lower pressure level.

A further advantage of the system according to certain preferred embodiment of the invention lies in the fact that no additional valve or the like is required to switch over the feed devices or to vary the feed pressure of the one pump because this is carried out solely by the control slides. Because control slides, which are however constructed with just one narrowed section, are, in any case, used in the equipment according to the prior art, the system, according to certain preferred embodiments of the invention, can be implemented without requiring an appreciable additional outlay in terms of costs or installation space.

In addition, the control slides comprise, as has already been mentioned above, a hydraulically self-regulating system which does not require any strategy for switching over or control. In the system according to certain preferred embodiments of the invention, the switching over of the one pump always takes place particularly advantageously at the earliest possible time. As a result, a pressure reduction occurs which is optimized in terms of efficiency and which on the one hand achieves a very high level of reliability in terms of the delivery quantity and on the other hand permits the power losses in the system to be reduced by way of the earliest possible switching over.

Even when leakage losses or the like rise owing to ageing, the system, according to certain preferred embodiments of the invention, permits automatically regulating adaptation to compensate said losses. Without a strategy, long-term monitoring or the like is necessary because the design, according to certain preferred embodiments of the invention, always automatically adjusts the necessary pressures and volume flows here in the purely hydraulic system.

The hydraulic system according to certain preferred embodiments of the invention functions here without the use of auxiliary power, which makes the system particularly suitable also for emergency operation.

According to the principle, it is, of course, possible, by calculating the delivery volumes of the two pumps, to configure the system in such a way that, for a respective specific application, for example a specific transmission, a ratio of the delivery volumes of the two feed devices with respect to one another is obtained which is optimum in terms of efficiency.

Furthermore, it is, of course, also possible to implement an oil supply with further additional feed devices, which makes even finer adaptation, and thus further reduction of the power losses, possible. Here, it is, of course, possible to make a careful selection between the expenditure in terms of the further feed devices and the benefit from the reduction of the power loss.

Other objects, advantages and novel features of the present invention will become apparent from the following detailed description of the invention when considered in conjunction with the accompanying drawings.

DETAILED DESCRIPTION OF THE DRAWINGS

The system and method for optimizing the efficiency of an oil supply is explained by way of example by reference to the oil supply of a continuously variable automatic transmission (CVT) which operates essentially with oil actuators at three different pressure levels. In a modified embodiment of the system for just two pressure levels, this can, of course, also be very favorable when used in an automatic transmission with gear-changing steps.

The higher pressure level, which is referred to below as high pressure level HD, extends here up to approximately 80 bar and is used to adjust a variator in the CVT. The next lowest pressure level, referred to below as low pressure level ND, extends up to approximately 35 bar and is used to actuate clutches. The lowest of the three pressure levels, which is referred to below as lubrication-pressure level SchD, extends to approximately 10 bar and is necessary for lubricating and for cooling in the CVT.

Figure 1:
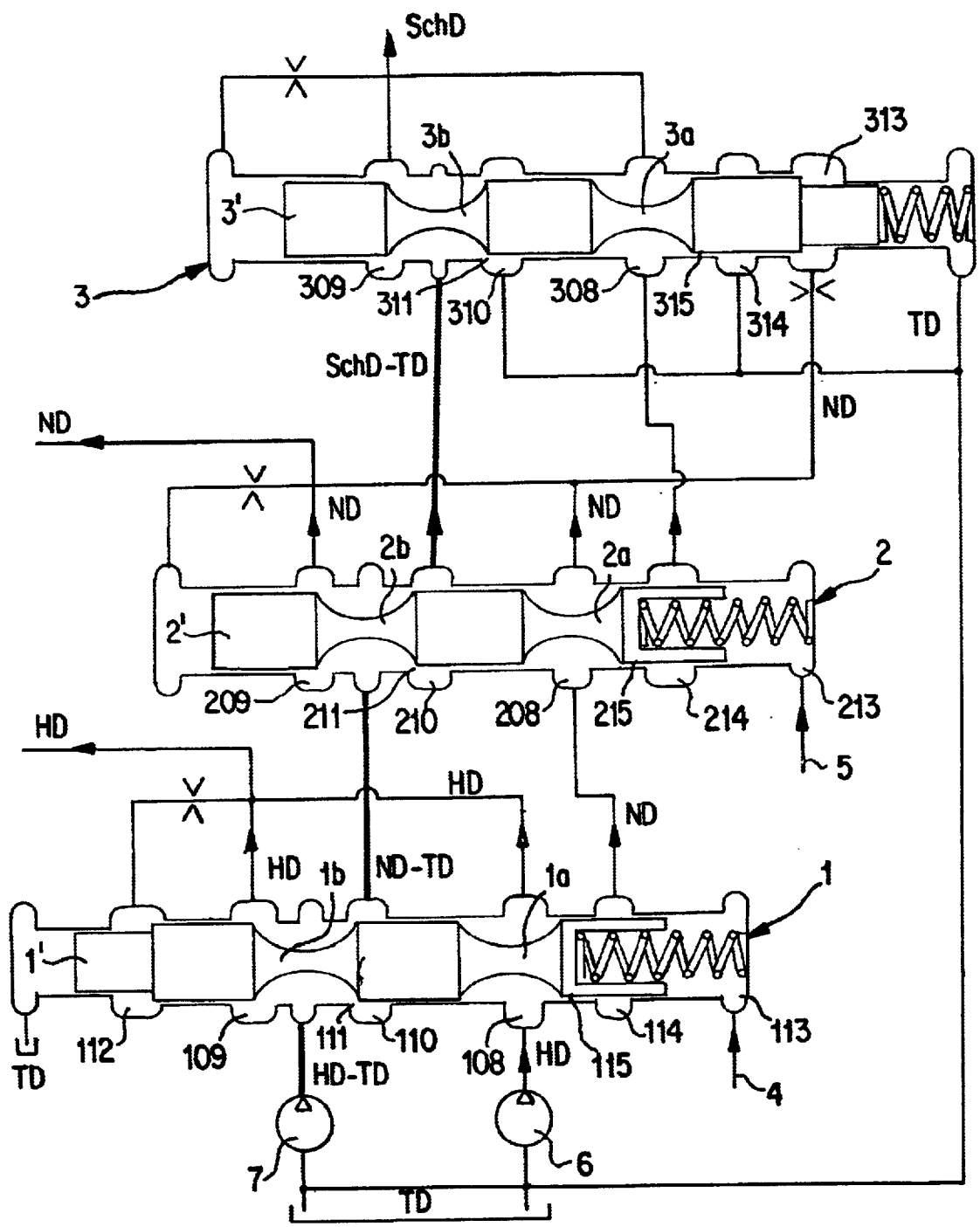
FIG. 1 shows a system supplying oil to a CVT at three different pressure levels.

FIG. 1 then shows a circuit diagram of such a system for optimizing the efficiency of the oil supply of the CVT just described. Each of the pressure levels HD, ND, SchD described is set by way of a separate control slide, as is customary in any case in most hydraulic controllers. Accordingly, a high-pressure control slide 1, a low-pressure control slide 2 and a lubrication-pressure control slide 3, which are provided for controlling the pressure and the volume flow in the respectively corresponding pressure levels, are shown here.

The control slides 1, 2, 3 are constructed in such a way that they each have a slide 1', 2', 3' which each have two narrowed sections 1a, 1b; 2a, 2b; 3a, 3b which are arranged at a fixed distance from one another. However, the method of pressure control, and thus optimization of the efficiency in the system at the individual control slides 1, 2, 3, is independent of the method of operation of these control slides 1, 2, 3. The control slides 1, 2, 3 can, as illustrated in the exemplary embodiment for example, operate as pressure-reducing valves, but they could also alternatively function as pressure-limiting valves.

FIG. 1 also shows various principles of pressure control at the control slides 1, 2, 3 and various pressure-boosting operations, presettings by way of spring forces and the like, which are, however, not decisive for the principle of the system for optimizing the efficiency, for which reason a more detailed description is not given at this point.

In the case illustrated in FIG. 1, in each case a pressure signal is issued at the two control slides 1, 2 via, in each case, one line, 4, 5 to one of the effective areas of the respective control slide 1, 2 in order to set a corresponding pressure downstream of the control slide 1, 2 in accordance with its ratio of the effective areas, that is to say the pressure transmission ratio. This pressure signal in the lines 4, 5 is generated in a manner by way of a proportional valve or the like or taken from the system at a suitable point, for which reason a more detailed description has not been given here.

Oil is then supplied according to FIG. 1 by way of two feed devices 6, 7 which are embodied, for example, as two pumps or pump chambers of a pump which can be completely independent of one another in terms of size and design. However, it would also be appropriate for reasons of space and cost to use a robust double chamber pump, for example a vane pump or a gearwheel pump, so that the two feed devices 6, 7 would be uniform in their design.

The first feed device 6 always operates at the high pressure level HD, and is therefore referred to below as high pressure pump 6. The second feed device 7 operates, depending on the operating state, at the high-pressure level HD, the low-pressure level ND, the lubrication-pressure level SchD or without pressure at the reservoir pressure level TD. Because the underlying pressure level for the second feed device 7 is therefore varied by the system for optimizing the efficiency of the oil supply, this second feed device 7 is referred to below as a variable pump 7.

If the position of the high-pressure control slide 1 is considered in FIG. 1, the high-pressure pump 6 feeds its complete delivery quantity or its complete volume flow via a lamina 108 and the first narrowed section 1a into the high-pressure level HD. The variable pump 7 also operates at the high-pressure level HD and feeds a delivery quantity into the high-pressure level HD via a lamina 109 and the second narrowed section 1b in the high-pressure control slide 1 which is at such a magnitude that the aimed-at pressure there is reached precisely. The excess delivery quantity is passed on into the low-pressure level ND at a lamina 110 via a throttle gap 111 which is also formed if appropriate. The effective control edge of the high-pressure control slide 1 is thus in the region of the lamina 110 in this operating state.

This illustrated position of the high-pressure control slide 1 corresponds to an operating state with a low rotational speed of the feed devices 6, 7 and with a high level of oil consumption in the high-pressure level HD. When the oil consumption drops at the high-pressure level HD and/or when the rotational speed of the feed device 6, 7 rises, the slide 1' of the high-pressure control slide 1 migrates in a manner continuously in the direction of the lamina 113 owing to the pressures acting on the effective areas of the slide 1' in the region of the laminas 112 or 113. As a result, an increasing delivery quantity of the variable pump 7 is fed into the low-pressure level ND via the lamina 110.

Finally, the volume flow generated by the high-pressure pump 6 is sufficient to supply the high-pressure level HD alone, and the slide 1' of the high-pressure control slide 1 closes the connection of the variable pump 7 to the high-pressure level HD in the region of the lamina 109. The variable pump 7 thus automatically only feeds into the low-pressure level ND via the lamina 110.

If the high-pressure pump 6 feeds a delivery quantity excess into the high-pressure level HD, said excess is passed on into the low-pressure level ND at a lamina 114 and via a further control gap 115 which is formed here. The control edge of the high-pressure control slide 1 is in the operating state then present in the region of the lamina 114.

The operation which has just been described for the high-pressure control slide 1 takes place in the same way also at the low-pressure control slide 2 and the lubrication-pressure control slide 3. The correspondingly involved narrowed sections, laminas and the like are provided, by analogy with the designations on the high-pressure control slide 1, with the designations 2a, 2b or 3a, 3b and 208, 209, 210, 211, 212, 213, 214, 215 and 308, 309, 310, 311, 312, 313, 314, 315, respectively.

In the position of the low-pressure control slide 2 according to FIG. 1, the oil which is fed by the high-pressure pump 6 and passed on into the low-pressure level ND via the high-pressure control slide 1 on the lamina 114 flows completely into the low-pressure level ND via the lamina 208 and the narrowed section 2a. The oil which is fed by the variable pump 7 and passed on from the high-pressure control slide 1 into the low-pressure level ND flows via the narrowed section 2b into the low-pressure level ND only to such an extent that the pressure aimed at in the low-pressure level ND by way of the pressure signal 5 is set precisely in accordance with the pressure transmission ratio of the low-pressure control slide 2. The excess delivery quantity is passed on into the lubrication-pressure level SchD via the narrowed section 2b and the region of the lamina 210 or the throttle gap 211.

When the oil consumption drops in the low-pressure level ND and/or the rotational speed of the pump rises, the low-pressure control slide 2 then continues to migrate in the direction of the lamina 213, and according to the principle the same control operation occurs as that which has already been described with reference to the high-pressure control slide 1.

The same operation can also be described analogously for the lubrication-pressure control slide 3. The excess oil, which is not required in the lubrication-pressure level SchD, is passed on here into the reservoir pressure level TD or into a reservoir.

Given a high rotational speed of the feed devices 6, 7 and/or low oil equipment of the actuators, it is possible that the high-pressure pump 6 is capable of supplying both the high-pressure level HD, the low-pressure level ND and the lubrication-pressure level SchD completely with oil. In this case, the lubrication-pressure control slide 3 closes the connection of the passed-on oil from the variable pump 7 to the lubrication-pressure level SchD at the lamina 309. As a result, the variable pump 7 automatically feeds oil only into the reservoir pressure level TD, and is therefore operating virtually without pressure and thus causes only minimum power losses.

The further hydraulic operations in the control slides 1, 2, 3 and their connections to one another are from the field of the hydraulics of conventional control slides and are therefore not explained in more detail.

Figure 2:
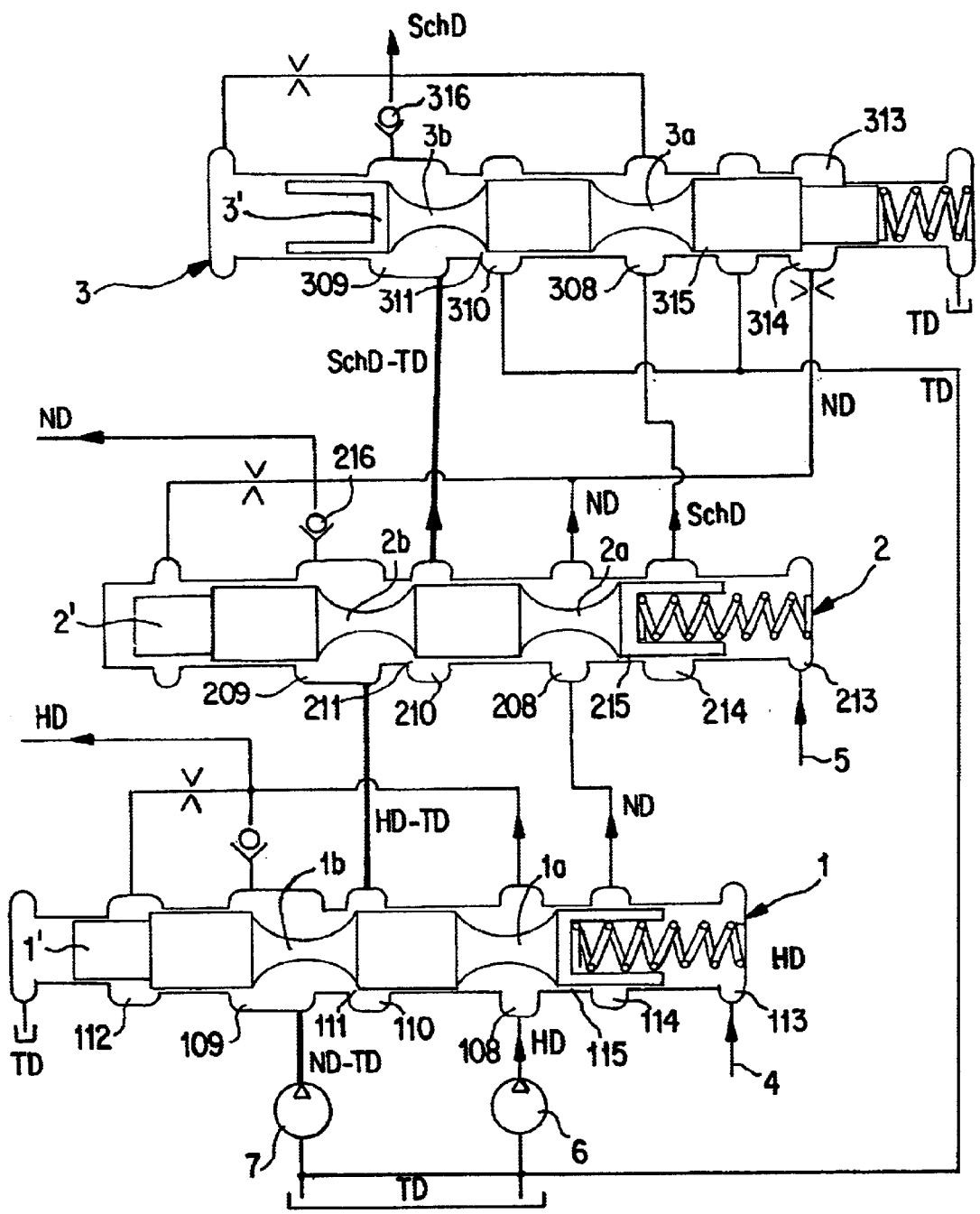
FIG. 2 shows an alternative embodiment of the system according to FIG. 1.

FIG. 2 shows an alternative embodiment of the system for optimizing the efficiency of the oil supply. Here, the embodiment variant in FIG. 2 is based on the same functional principle as already described above. The embodiment of the laminas 109, 209 and 309 has been selected differently. In order to maintain the functional principle described above, the connections between the region of the second narrowed section 1b, 2b, 3b and the respective higher of the two pressure levels derived from the respective control slide 1, 2, 3 are also each provided with a non-return valve 116, 216, 316.

Because what is referred to as a negative overlap must in any case always be present in the region of the second narrowed section 1b, 2b, 3b so that the variable pump 7 does not have to feed against a "closed" slide in any operating situation, the configuration of the overlap lengths at the slides 1', 2', 3' of the control slides 1, 2, 3 is simplified considerably. Slight production differences during the manufacture of the control slides 1, 2, 3 can thus also be coped with more easily.

In addition, it is possible to avoid a situation in which the oil supplied by the high-pressure pump 6 can be fed back into a low pressure level via the laminas 109, 209 and 309 in specific control positions of the slides 1', 2', 3'. As a result, the switching operations can each take place at a still earlier time, resulting in further advantages in terms of efficiency.

In addition, FIG. 2 illustrates a further particular feature because here the slides 1', 2', 3' of the control slides 1, 2, 3 are each of the same design, which is particularly favorable in terms of manufacture in large numbers because here it is possible in each case to use only identical components as internals of the respective control slides 1, 2, 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for optimizing efficiency of an oil supply, comprising:
   at least two different oil pressure level outlets,
   at least two feed devices for oil volume flows of the oil supply,
   and at least one control slide for controlling at least one of the oil pressure level outlets,
   wherein the at least one control slide has at least two narrowed sections, each of the narrowed sections being assigned one of the feed devices and, depending on a position of the narrowed sections in the control slide, the respective volume flows being automatically distributable into the at least two pressure level outlets for each of the feed devices as a function of an oil requirement at the respective pressure level outlet.

2. A system according to claim 1,
   wherein the narrowed sections are designed so that, when during a correspondingly high oil volume flow requirement in a higher of the pressure level outlets, a first of the feed devices feeds a first of the volume flows into the higher pressure level outlet via a first of the narrowed sections,
   wherein a second of the feed devices feeds into the higher pressure level outlet via a second of the narrowed sections and makes available part of a second of the volume flows into a lower pressure level outlet via a throttle gap,
   wherein when the volume flow requirement at the higher pressure level outlet is dropping, the second feed device feeds substantially exclusively into the lower pressure level outlet via the second narrowed section of the control slide, and
   wherein when the volume flow requirement continues to fall the second feed device operates at a lower pressure level than the low pressure level outlet or approximately without pressure via the second narrowed section of the control slide while the first feed device makes available part of the first volume flow to the higher pressure level outlet via the first narrowed section, and part of the first volume flow to the lower pressure level outlet via a further throttle gap.

3. A system according to claim 1, wherein the two narrowed sections in the control slide are arranged at a fixed distance from one another.

4. A system according to claim 2, wherein the two narrowed sections in the control slide are arranged at a fixed distance from one another.

5. A system according to claim 1, wherein the two feed devices are designed as two independent pump chambers of a pump.

6. A system according to claim 2, wherein the two feed devices are designed as two independent pump chambers of a pump.

7. A system according to claim 3, wherein the two feed devices are designed as two independent pump chambers of a pump.

8. A system according to claim 1, wherein the feed devices are designed as constant delivery pumps.

9. A system according to claim 2, wherein the feed devices are designed as constant delivery pumps.

10. A system according to claim 3, wherein the feed devices are designed as constant delivery pumps.

11. A system according to claim 5, wherein the feed devices are designed as constant delivery pumps.

12. A system according to claim 1, wherein the volume flows can be fed into at least one further pressure level outlet via at least one further control slide.

13. A system according to claim 2, wherein the volume flows can be fed into at least one further pressure level outlet via at least one further control slide.

14. A system according to claim 3, wherein the volume flows can be fed into at least one further pressure level outlet via at least one further control slide.

15. A system according to claim 5, wherein the volume flows can be fed into at least one further pressure level outlet via at least one further control slide.

16. A system according to claim 8, wherein the volume flows can be fed into at least one further pressure level outlet via at least one further control slide.

17. A system according to claim 1, wherein said system serves to supply an automatic continuously variable transmission at three pressure levels and has the two feed devices and three of the control slides, an external pressure signal for setting a highest of the three pressure levels being present at an effective area of the first control slide, the respective first narrowed section being supplied with oil directly or indirectly via the first feed device, and the respective second narrowed section being supplied with oil directly or indirectly via the second feed device.

18. A system according to claim 2, wherein said system serves to supply an automatic continuously variable transmission at three pressure levels and has the two feed devices and three of the control slides, an external pressure signal for setting a highest of the three pressure levels being present at an effective area of the first control slide, the respective first narrowed section being supplied with oil directly or indirectly via the first feed device, and the respective second narrowed section being supplied with oil directly or indirectly via the second feed device.

19. A system according to claim 3, wherein said system serves to supply an automatic continuously variable transmission at three pressure levels and has the two feed devices and three of the control slides, an external pressure signal for setting a highest of the three pressure levels being present at an effective area of the first control slide, the respective first narrowed section being supplied with oil directly or indirectly via the first feed device, and the respective second narrowed section being supplied with oil directly or indirectly via the second feed device.

20. A system according to claim 5, wherein said system serves to supply an automatic continuously variable transmission at three pressure levels and has the two feed devices and three of the control slides, an external pressure signal for setting a highest of the three pressure levels being present at an effective area of the first control slide, the respective first narrowed section being supplied with oil directly or indirectly via the first feed device, and the respective second narrowed section being supplied with oil directly or indirectly via the second feed device.

21. A system according to claim 8, wherein said system serves to supply an automatic continuously variable transmission at three pressure levels and has the two feed devices and three of the control slides, an external pressure signal for setting a highest of the three pressure levels being present at an effective area of the first control slide, the respective first narrowed section being supplied with oil directly or indirectly via the first feed device, and the respective second narrowed section being supplied with oil directly or indirectly via the second feed device.

22. A system according to claim 12, wherein said system serves to supply an automatic continuously variable transmission at three pressure levels and has the two feed devices and three of the control slides, an external pressure signal for setting a highest of the three pressure levels being present at an effective area of the first control slide, the respective first narrowed section being supplied with oil directly or indirectly via the first feed device, and the respective second narrowed section being supplied with oil directly or indirectly via the second feed device.

23. A system according to claim 1, wherein a sum of the volume flows of the at least two feed devices is at least equal to the oil requirement in all operating states.

24. A system according to claim 2, wherein a sum of the volume flows of the at least two feed devices is at least equal to the oil requirement in all operating states.

25. A system according to claim 3, wherein a sum of the volume flows of the at least two feed devices is at least equal to the oil requirement in all operating states.

26. A system according to claim 5, wherein a sum of the volume flows of the at least two feed devices is at least equal to the oil requirement in all operating states.

27. A system according to claim 8, wherein a sum of the volume flows of the at least two feed devices is at least equal to the oil requirement in all operating states.

28. A system according to claim 12, wherein a sum of the volume flows of the at least two feed devices is at least equal to the oil requirement in all operating states.

29. A system according to claim 17, wherein a sum of the volume flows of the at least two feed devices is at least equal to the oil requirement in all operating states.

30. An oil supply system, comprising:
a first oil pressure level outlet,
a second oil pressure level outlet which is different in pressure from said first oil pressure level outlet,
a first feed device operatively supplying a first oil volume flow,
a second feed device operatively supplying a second oil volume flow, and
at least one control slide operatively controlling at least one of the oil pressure level outlets and having at least two narrowed sections,
wherein each of the narrowed sections operatively communicates with a respective one of the feed devices, and
wherein depending on positions of the narrowed sections in the control slide, the respective oil volume flows are automatically distributable into the pressure level outlets as a function of an oil requirement at the pressure level outlets.

31. An oil supply system according to claim 30, wherein the two feed devices are designed as two independent pump chambers of a pump.

32. An oil supply system according to claim 30, wherein the feed devices are designed as constant delivery pumps.

33. A method of making an oil supply system having at least two different oil pressure levels, comprising:
providing at least two feed devices for supplying oil volume flows,
connecting at least one control slide for controlling at least one of the oil pressure levels, said slide having at least two narrowed sections, and
assigning each of the narrowed sections to one of the oil pressure levels so that, depending on positions of the narrowed sections in the control slide, the respective volume flows are automatically divided into the at least two pressure levels for each of the feed devices as a function of an oil requirement in the respective pressure level.

34. A method according to claim 33,
wherein the narrowed sections are designed so that, when during a correspondingly high oil volume flow requirement in a higher of the pressure levels, a first of the feed devices feeds a first of the volume flows into the higher pressure level via a first of the narrowed sections,
wherein a second of the feed devices feeds into the higher pressure level via a second of the narrowed sections and makes available part of a second of the volume flows in a lower pressure level via a throttle gap,
wherein when the volume flow requirement in the higher pressure level is dropping, the second feed device feeds substantially exclusively into the lower pressure level via the second narrowed section of the control slide, and wherein when the volume flow requirement continues to fall the second feed device operates at a lower pressure level than the low pressure level or approximately without pressure via the second narrowed section of the control slide while the first feed device makes available part of the first volume flow to the higher pressure level via the first narrowed section, and part of the first volume flow to the lower pressure level via a further throttle gap.

35. A method of operating an oil supply system having at least two different oil pressure levels to optimize efficiency, comprising:

supplying at least two oil volume flow of the oil supply via respective feed devices, controlling at least one of the oil pressure levels via at least one control slide, and automatically dividing the oil volume flow into the at least two pressure levels for each of the feed devices as a function of an oil requirement in the respective pressure level depending on positions of at least two narrowed sections each of which is assigned to one of the feed devices and arranged in the control slide.

36. A method according to claim 35, wherein the narrowed sections are designed so that, when during a correspondingly high oil volume flow requirement in a higher of the pressure levels, a first of the feed devices feeds a first of the volume flows into the higher pressure level via a first of the narrowed sections, wherein a second of the feed devices feeds into the higher pressure level via a second of the narrowed sections and makes available part of a second of the volume flows in a lower pressure level via a throttle gap, wherein when the volume flow requirement in the higher pressure level is dropping, the second feed device feeds substantially exclusively into the lower pressure level via the second narrowed section of the control slide, and wherein when the volume flow requirement continues to fall the second feed device operates at a lower pressure level than the low pressure level or approximately without pressure via the second narrowed section of the control slide while the first feed device makes available part of the first volume flow to the higher pressure level via the first narrowed section, and part of the first volume flow to the lower pressure level via a further throttle gap.

* * * * *